United States Patent [19]

Takeda et al.

[11] Patent Number: 5,511,178

[45] Date of Patent: Apr. 23, 1996

[54] CACHE CONTROL SYSTEM EQUIPPED WITH A LOOP LOCK INDICATOR FOR INDICATING THE PRESENCE AND/OR ABSENCE OF AN INSTRUCTION IN A FEEDBACK LOOP SECTION

[75] Inventors: Hiroshi Takeda; Shigezumi Matsui, both of Tokyo, Japan

[73] Assignee: Hitachi, Ltd., Tokyo, Japan

[21] Appl. No.: 156,301

[22] Filed: Nov. 23, 1993

[30] Foreign Application Priority Data

Feb. 12, 1993 [JP] Japan .................. 5-047302

[51] Int. Cl.$^6$ .................................. G06F 12/02
[52] U.S. Cl. .................. 395/452; 395/460; 364/DIG. 1; 364/243.41
[58] Field of Search ............... 364/200 MS File, 364/700 MS File; 395/400, 425, 440, 403, 444, 445, 450, 452, 456, 479, 460, 461

[56] References Cited

U.S. PATENT DOCUMENTS

| | | | |
|---|---|---|---|
| 4,513,367 | 4/1985 | Chan et al. .................. | 395/425 |
| 4,977,498 | 12/1990 | Rastegar et al. ............ | 395/425 |
| 5,353,425 | 10/1994 | Malamy et al. ............. | 395/425 |

OTHER PUBLICATIONS

"ADJ-602-065 of Section 6 Cache," Temporary Version of Hitachi 32—bit RISC Processor PA/10 HD69010 Hardware Manual, pp. 83–85. (English translation provided).

*Primary Examiner*—Eddie P. Chan
*Assistant Examiner*—Hiep T. Nguyen
*Attorney, Agent, or Firm*—Fay, Sharpe, Beall, Fagan, Minnich & McKee

[57] ABSTRACT

In a cache memory 20, there exist a plurality of cache lines 201, each of which is equipped with a loop lock L for indicating that an instruction is present in a feedback loop section. The states of the loop locks L are dynamically changed according to the executed state of a program. At the time of excluding the cache lines for a prefetch, the instruction string in the loop is held in the cache memory 20 till the program control transfers to the outside of the loop.

26 Claims, 12 Drawing Sheets

CACHE CONTROL SYSTEM EQUIPPED WITH A LOOP LOCK INDICATOR FOR INDICATING THE PRESENCE AND/OR ABSENCE OF AN INSTRUCTION IN A FEEDBACK LOOP SECTION

BACKGROUND OF THE INVENTION

The present invention relates to a cache control system utilizing a cache memory for an instruction cache memory and/or a data cache memory or commonly for instructions and data and, more particularly, to a technology which is effective if applied to a data processor or a microcomputer system utilizing such cache memory packaged in or attached to the outside thereof.

As a method for improving the processing ability of a central processing unit, a cache memory, which has a lower capacity but can access instructions or data at a higher speed than an external large-capacity memory (e.g., RAM/ROM, a hard disc unit or a floppy disc drive unit) and which is used for reading the information of the external memory partially. Such central processing unit can continue the data processing while referring to the instructions or data in the cache memory while the information is present in the cache memory, so that the data processing ability can be drastically improved better than the executions while accessing to the external large capacity memory. If, however, none of the information demanded by the central processing unit is present, the cache memory interrupts the execution of instructions by the central processing unit to read and latch the necessary information from the external large capacity memory and then reopens the interrupted data processing of the central processing unit. If this state frequently occurs, the central processing unit has its performance dropped substantially. In order to maximize the performance of the central processing unit, therefore, the necessary information always has to be present in the cache memory during the execution so as to eliminate the interruption of the instruction execution.

The engineer designing a system by using the central processing unit is well acquainted with the fact that the result of a benchmark indexing the performance highly depends upon the capacity of a cache memory (of packaged and/or outside ones) or its control method, and the capacity and method of the cache memory are one of important points of selection for adopting the central processing unit. In a design stressing the performance, the cache memory control is carried out in the LSI, and the high speed memory of relatively high capacity is connected as the cache memory with the outside of the LSI. In the design stressing the system cost, on the other hand, the system is designed at a low cost with a small number of parts, so that a single-chip microcomputer is given a high performance and a compact construction by packaging the cache memory (and a peripheral device such as a communication port or timer) in the LSI.

The high speed processor having the cache memory packaged therein is described, for example, in "ADJ-602-065 of Section 6 Cache" of pp. 83 to 85 of "Temporary Version of Hitachi 32-bit RISC Processor PA/10 HD69010 Hardware Manual". This cache memory is equipped with a plurality of cache lines. Each cache line is composed of: a cache tag for storing a valid address (or virtual address or physical address) indicating which position (or address) of the external memory is corresponded to by the information latched by the cache line; a data portion for storing the information of consecutive n-words (e.g., four words) headed by the valid address; and a valid bit indicating whether or not the information stored in the cache line is valid.

The aforementioned cache memory has a "fetch" operation for the data processor or central processing unit to read instruction in accordance with an instruction executing procedure and a "line fetch" to read a valid instruction from the external memory if no valid instruction is present in the cache memory. Specifically, the instruction fetch control unit decides whether or not a valid information is present in the instruction cache memory, on the basis of the instruction address from the central processing unit and the information of the cache tag in the instruction cache memory, and controls the fetch of the central processing unit and the line fetch to read a valid instruction automatically from the external memory. Incidentally, the instruction fetch control unit is operated by the packaged control program or control logic in accordance with the specifications which are independent from the instruction control of the program and intrinsic to the LSI, so as to speed up the operations.

If no valid information is present in the cache memory during the instruction execution, the central processing unit has to interrupt it temporarily till a valid information is read from the external memory by the line fetch. This execution interruption period is called the "mishit penalty", which influences the drop of the system performance as the operating speed of the central processing unit is drastically accelerated to extend the difference in the access time from the external memory. Thus, there has been positively carried out the (prefetch) method of reading the information, which is expected to be used in the future by the central processing unit, in advance to the execution by the central processing unit. For example, the instruction prefetch is controlled by the instruction fetch control unit and is operated substantially like the line fetch except that the expected address is used.

SUMMARY OF THE INVENTION

We have found out the following fact. In case of sequential addresses from a less significant one to a more significant one, the instruction prefetch is enabled to contribute to an improvement in the performance merely by reading the instruction of the address preceding the instruction execution of the central processing unit. If a condition branching instruction is prefetched at random in case the condition branching instruction appears in the program, the instructions or data to be executed again in extremely near future are excluded to cause a drop in the performance of the system. If the condition branching instruction appears, there can be used a method of interrupting the prefetch of the instructions on and after said condition branching instruction, till the result of the condition decision is obtained, so as to avoid the aforementioned danger and inhibit the reading of unnecessary information. Especially in the loop structure composed of backward condition branching instructions (i.e., the instructions branching backward of the instruction executing order with respect to the address of the instruction being executed), the instruction string should be prefetched as much as allowed for the performance improvement to the outside of the loop. Thus, this method cannot extract the effect of the prefetch sufficiently.

An object of the present invention is to provide a cache memory control system which is enabled to prevent the instructions to be executed again in an extremely near future or the data to be used from being excluded from the cache memory by the prefetch.

Another object of the present invention is to provide a cache memory control system which can prefetch an instruction string outside of a loop section including a condition branching instruction, as much as possible even if said condition branching instruction should appear.

The aforementioned and other objects and novel features of the present invention will become apparent from the following description to be made with reference to the accompanying drawings.

A representative of the invention to be disclosed herein will be briefly described in the following.

(1) There is provided either means for indicating that instructions having a high probability of being executed again or data having a high probability of being used are present in a plurality of cache lines existing in a cache memory, or means indicating that instruction having a low probability of being executed again or data having a low probability of being used are present. The setting of that means is dynamically updated according to the executed state of the program so that the means is referred to, when the cache lines for the prefetch are to be excluded, to cause the cache memory to latch the data having a high probability of being executed or the data having a high probability of being used.

(2) The aforementioned means is an area for indexing the locality of information to be fetched by the instruction executing means for executing the instructions fetched according to a predetermined procedure and is provided to correspond to the cache lines. The decision of the presence of the locality is determined by the decision of instruction execution control means whether or not the instructions to be fetched and executed by it are contained in the instruction string constituting a feedback loop. In short, the execution of instructions or data already present in the cache memory or the probability of being used is judged from the structure of the program and is decided. (3) In case the cache memory is of direct memory map type, the locality index area can be constructed as flags or bits in each cache line. In case the cache memory has a set associative structure, the locality index area can be constructed in a manner to correspond to the LRU (i.e., Least Recently Used) flag contained in the cache line or as a component. The set associative structure includes: a plurality of direct memory map portions individually having different cache lines corresponding to a common address information outputted by the instruction fetch control means; and flag means (LRU) for indicating the cache line which is most recently referred to for the cash lines corresponding to the aforementioned common address information in each direct memory map portion. (4) The locality index area of the cache lines containing the instructions constituting the feedback loop is decided to have the locality during the instruction execution of the feedback loop section, so that said cache lines are inhibited from being excluded at the time of the instruction prefetch. When the instruction to be executed transfers to the outside of the feedback loop section, in order to raise the efficiency by the prefetch by enabling the inhibited cache lines to be excluded, it is desired to initialize the locality index area into the no locality state in synchronism with the transfer to the outside of the feedback loop. (5) In the aforementioned set associative structure, the cache line containing the instruction used in the feedback loop area is so flagged by the flag means (LRU) as the low exclusion priority (or the high priority of being referred to again) of the cache line because it was referred to most lately in the flag means. When the instruction to be executed transfers to the outside of the feedback loop area, in order to latch the information having a high probability of being used again in the cache memory (that is, in order to exclude the information having a low probability of being used again positively from the cache memory) by setting such cache line positively to a target to be excluded, it is desired to change the state of the flag means (LRU) such that the cache line corresponding to the locality index area to be initialized to no locality state is changed to the cache line which is not referred to most recently, in synchronism with the initialization of the locality index area to the no locality state.

(6) Whether or not the instruction to be executed belongs to a series of instructions constituting the feedback loop may be decided by forming in the instruction format a loop information area for implying whether or not said instruction belongs to the feedback loop and by decoding the loop information area. This loop information area can be added to the instruction of the object program at the stage of compiling the source program.

(7) In order to correspond easily to the multiplexed feedback loop section, the loop information area of each instruction is caused to latch the information for indicating whether or not the instruction is the head of the feedback loop section composed of a string of series instructions from the branched instruction to said branching instruction, whether or not the instruction is the tail of the feedback loop section, whether or not the instruction is an intermediate one of the feedback loop section, or whether or not the instruction belongs to the feedback loop section. There is further provided a loop section flag indicating whether or not the instruction execution state by the instruction execution control means is within the feedback loop section. The aforementioned instruction execution control means sets the aforementioned loop section flag by decoding the loop information area to detect that said instruction is the head of the feedback loop section. If the loop information area is decoded by the instruction execution control means to reveal that said instruction is an intermediate one of the feedback loop section and that the aforementioned loop section flag is set, the locality index area corresponding to the cache line containing that instruction is set into a locality state. If said instruction is the tail of the feedback loop section and if the processing is transferred to the outside of the feedback loop section, the locality index area of the cache line containing the instructions constituting said feedback loop section is set to the no locality state.

According to the means described above, the instruction to be conditionally branched backward for the present execution address is given the loop structure for executing the same instruction string repeatedly. As a result, the instruction string in the loop is held in the cache memory till the program control transfers to the outside of the loop in accordance with the condition decision, so that the number of times of accessing to the external memory is reduced to improve the performance of the system utilizing the cache memory. Moreover, when the instruction to be executed transfers to the outside of the feedback loop section, the positive or preferential exclusion of the instructions of said loop section from the cache memory acts to improve the data processing efficiency by the prefetch.

While the instruction string in the feedback loop is being executed, the instructions in the loop are held as many as possible in the cache memory. Once the program control (or program flow) transfers to the outside of the loop, the instructions in said feedback loop are promptly excluded from the cache memory. Thus, the processing efficiency of the system by the cache memory can be improved to the maximum.

DESCRIPTION OF THE PREFERRED EMBODIMENTS

The present invention will be described in connection with its embodiments sequentially in accordance with the following items.

[1] Microcomputer System

[2] Direct Memory Map Type Cache Memory Applied System

[3] Feedback Loop

[4] Loop Hint and Feedback Loop Recognizing Method

[5] Loop Lock Controlling Method

[6] Set Associative Type Cache Memory Applied System (Using Loop Lock)

[7] Set Associative Type Cache Memory Applied System (Using Loop Mark)

[1] Microcomputer System

Figure 12:
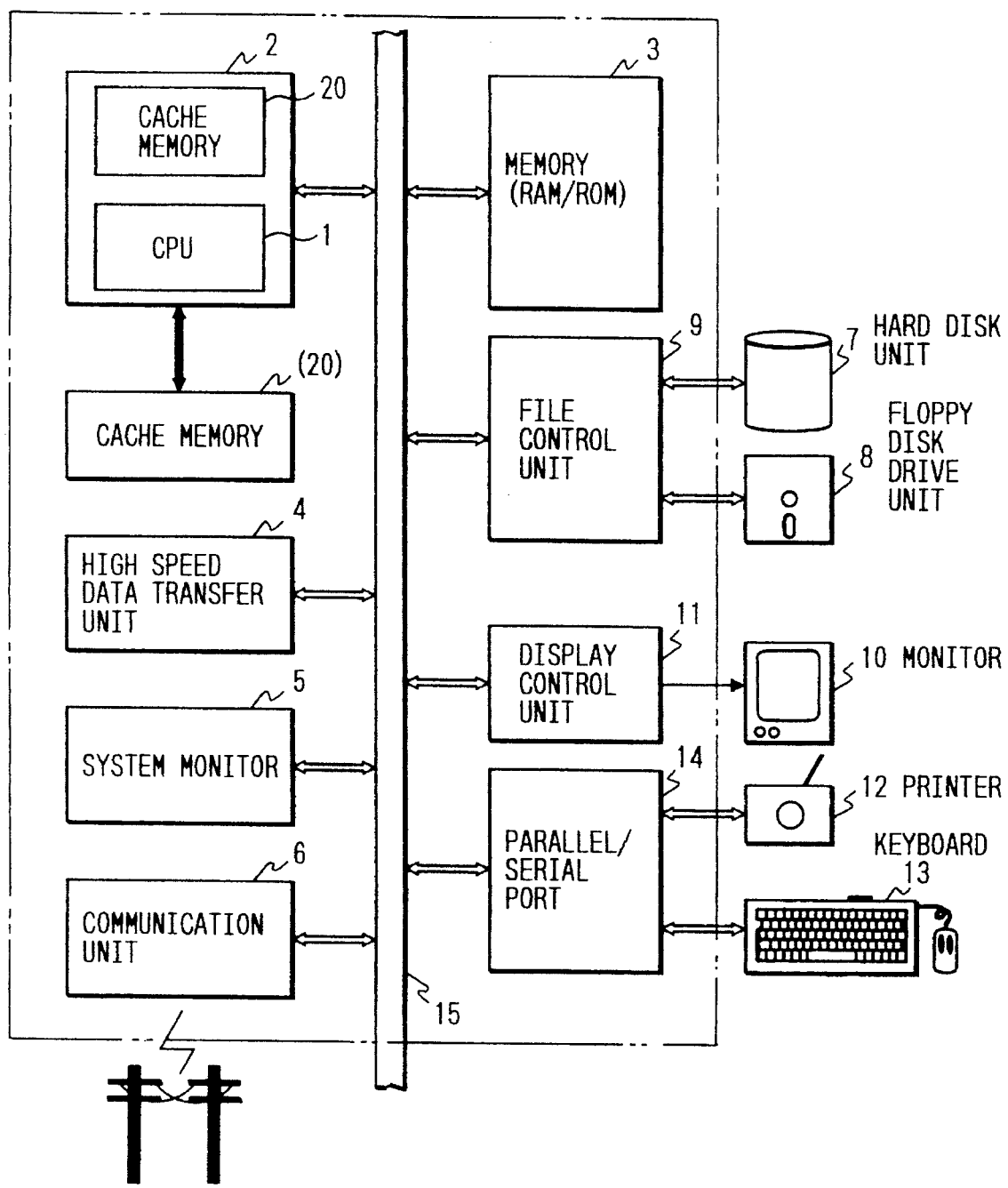
FIG. 12 is a block diagram showing one example of a microcomputer system to which is applied a cache control system according to one embodiment of the present invention.

FIG. 12 is a block diagram showing one example of a microcomputer system to which is applied a cache control system according to one embodiment of the present invention.

The system, as shown, is constructed to include: a data processing unit 2 having a central processing unit (CPU) 1; a memory 3 composed of a RAM (i.e., Random Access Memory) for providing an operation area of the central processing unit 1 or a temporary data latching area and a ROM (i.e., Read Only Memory) stored with data or a system program for an OS (i.e., Operating System); a high speed data transfer unit 4 such as a DMAC (i.e., Direct Memory Access Controller); a system monitor 5 utilizing a programmable timer or the like; a communication unit 6 for supporting the communication control such as a local area network or ISDN; a file control unit 9 to be interfaced with a hard disk unit 7 or a floppy disk drive unit 8; a display control unit 11 for display control of a monitor 10 such as a CRT (i.e., Cathode Ray Tube); and a parallel/serial port 14 to be interfaced with a printer 12 or a keyboard 13. All of these components share a bus 15 to exchange data or commands. The central processing unit 1 controls the individual parts by executing the operation programs, which are read in the RAM from the hard disk unit 7, the floppy disk drive unit 8 or the ROM, in a predetermined procedure. Incidentally, the area enclosed by double-dotted lines in FIG. 12 can be constructed in either shape of a multi-chip computer or a shingle-chip microcomputer.

In order to improve the processing ability of the central processing unit 1, the system of FIG. 12 is equipped with a cache memory 20 for reading the information of a portion of an external large capacity memory (such as the memory 3 such as the RAM/ROM, the hard disk unit 1 or the floppy disk drive unit 8). The cache memory 20 has a relatively small capacity but can access instructions or data at a higher speed than the large capacity memory. The cache memory 20 is packaged in the data processing unit 2, as shown, but may be closely attached to the outside of the data processing unit 2.

The central processing unit 1 continues its data processing with reference to the instructions and data in the cache memory 20 while information is present in the cache memory 20. Thus, the processing efficiency can be drastically improved more than the execution of an instruction while accessing directly to the external large capacity memory each time. In case the cache memory 20 has none of the information required by the central processing unit 1, it causes the central processing unit 1 to interrupt execution of an instruction temporarily, reads necessary information from the external large capacity memory, holds it and then causes the central processing unit 1 to restart the interrupted data processing.. If this state occurs frequently, the data processing performance by the central processing unit essentially drops.

In the present embodiment, either the instruction having a high probability of being executed again or the data having a high probability of being used is excluded from a target to be excluded for prefetch, so that the information required during the data processing may always be present in the cache memory so as to eliminate a substantial interruption of the instruction execution, whereby the number of times of accessing the external memory 3 is reduced to improve the performance of the system utilizing the cache memory.

[2] Direct Memory Map Type Cache Memory Applied System

Figure 1:
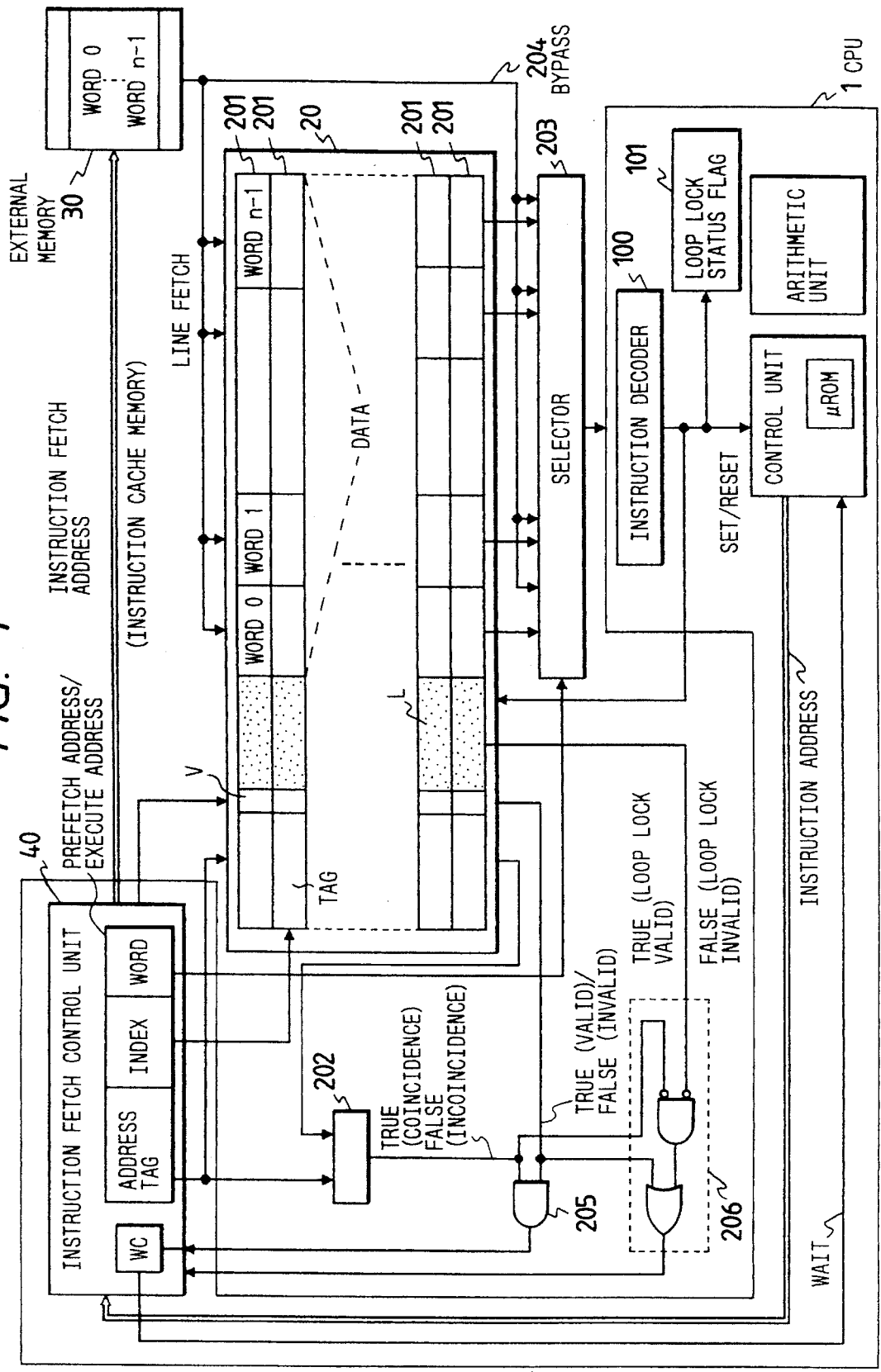
FIG. 1 is a block diagram showing one embodiment of a cache control system utilizing a cache memory of direct memory map type.

FIG. 1 is a block diagram showing one embodiment of the cache control system. In the present embodiment, the cache memory 20 is a direct memory map type instruction cache memory. In FIG. 1, reference numeral 30 designates an external memory which is a general name of a large capacity memory such as the memory 3 or the aforementioned RAM/ROM, the hard disk unit 7 or the floppy disk drive unit 8. Numeral 40 designates an instruction fetch control unit for controlling the prefetch of an instruction from the external memory 30 to the cache memory 20 and the instruction fetch from the cache memory 20 to the central processing unit 1. In FIG. 1, this central processing unit 1 is composed to include the instruction fetch control unit 40, an instruction decoder 100, a loop lock status flag 101, a control unit and an arithmetic unit, all of which are formed over a single semiconductor chip by the well-known semiconductor fabrication technology.

The cache memory 20 is equipped with a plurality of cache lines 201 for storing the instructions, which were once fetched and are to be fetched by the central processing unit 1, in a manner to correspond to their address information. Each cache line 201 is equipped with a cache tag TAG, a valid bit V, a loop lock L and a data portion DATA. The cache data DATA latches an effective address (e.g., a virtual address or a physical address) indicating which of the position (or address) of the external memory 30 is corresponded to by the information of one cache line 201. The data portion DATA stores the information of sequential n-words, which is headed by the effective address corresponded to by the cache TAG. The valid bit V is a bit area indicating whether or not the information stored in the cache line 201 is valid. Incidentally, the access unit of the instruction to be described hereinafter is a word (or 16 bits) unit, although not especially limitative thereto.

The loop lock L is an area for indexing the locality of the instruction fetched by the central processing unit 1. According to the present embodiment, if the instruction fetched and to be executed by the central processing unit 1 is contained in an instruction string constituting the feedback loop the loop lock corresponding to the cache line latching the instruction is set as means the locality. According to the present embodiment, whether or not the instruction to be executed constitutes the feedback loop is decided by the instruction decoding of the instruction decoder 100, so that the corresponding loop lock L is set or reset according to the decision result. The decoded result is reflected upon the loop lock status flag 101.

The instruction fetch control unit 40 reads the instruction to be executed by the central processing unit 1 from the cache memory 20 and enables it to be fetched by the central processing unit 1. Specifically, the control unit in the central processing unit 1 demands the instruction fetch control unit 40 for the reading of the instruction which is to be executed next by the presumption from the instruction being executed. At this time, the control unit gives an instruction address to the instruction fetch control unit 40. This instruction fetch control unit 40 retrieves whether or not the relevant instruction is present in the cache memory 20, by using the given instruction address as an execution address. For this retrieval, the instruction fetch control unit 40 utilizes the trisected portions of the execution address, i.e., the address tag, the index and word. For example, the index located in an intermediate bit of the execution address is used to select the cache line of the cache memory. In case the number of the cache lines is 256, for example, the index has eight bits, and one is selected from cache lines 0 to 255. The cache tag TAG of the selected cache line and the address tag of the execution address are compared a coincidence detector 202.

Next, it is confirmed whether or not the relevant instruction is present in the selected cache line 201. Specifically, this confirmation is executed by an execution address decider 205, as represented by an OR gate in FIG. 1. Whether or not a valid instruction has already been read (or written) in the cache line 201 is indicated by the valid bit V, and this valid bit V and the output of the coincidence detector 202 are fed to the execution address decider 205. If the output of the coincidence detector 202 is the coincidence or true (to take the high level according to the present embodiment) so that the aforementioned valid bit V is true (to take the high level), the execution address decider 205 informs the instruction fetch control unit 40 of the fact that the relevant instruction is present in that cache line. Then, the instruction fetch control unit 40 controls a selector 203 with the word located at the less significant side of the execution address, to transfer the relevant instruction on the selected cache line to the central processing unit 1. In case the information of one word has 16 bits, for example, the word area of the execution address is given 4 bits, and one word is selected from the totally sixteen words 0 to 15.

If the valid bit V of the selected cache line is false (to take the low level according to the present embodiment) or if the comparison result of the coincidence detector 202 is incoincidence or false (to take the low level), the execution address decider 205 informs the instruction fetch control unit 40 of the fact that the relevant instruction is not present in the cache line assigned by the index area of the execution address. In response to this information, the instruction fetch control unit 40 fetches the instruction of one cache line including the relevant instruction from the external memory 30 to the relevant cache line of the cache memory 20 by using the instruction fetch address (corresponding to the execution address) generated from the instruction address. At the time of this line fetch, the instruction fetch control unit 40 controls the selector 203, as in the above, with the word located at the less significant side of the address and transfers the relevant instruction to the central processing unit 1 through the instruction cache memory 20 or a bypass 204. Simultaneously with the end of the line fetch, the valid bit V of said cache line is set true, and the cache tag is set with the content corresponding to the address tag of the instruction fetch address. The instruction fetch control unit 40 has a wait signal generator WC. This wait signal generator WC feeds a wait signal wait for stopping the execution control of the instruction temporarily to the control unit when it is fed from the execution address decider 205 with a signal indicating that the relevant instruction is not present. The control unit restarts the execution control of the instruction when it is fed with the instruction through the selector 203 and the instruction decoder 100.

The instruction fetch control unit 40 executes the prefetch control of the instruction as well as the instruction fetch control by the aforementioned execution address. Specifically, if the central processing unit 1 exchanges no data with the external memory 30, the instruction fetch control unit 40 line-fetches the instruction from the external memory 30 to the relevant cache line 201 of the cache memory 40 by using the prefetch address which is estimated from the instruction execution address by the central processing unit 1. Simultaneously with the end of the line fetch, the valid bit V of the relevant cache line is set true, and the cache tag TAG is set with the content of the address tag of the prefetch address. This prefetching operation is executed only if the instruction indicated by the prefetch address is not present in the cache line corresponded to by the prefetch address.

This prefetch control will be described in more detail in the following. At first, the instruction fetch control unit 40 uses the prefetch address to retrieve whether or not the relevant instruction is present in the cache memory 20. For this retrieval, the trisected portions of the address tag, the index and the word of the prefetch address are utilized. The index of the prefetch address is used for selecting the cache line of the cache memory 20. Whether or not a valid instruction has already been read in the cache line 201 is indicated by the valid bit V. The output of the coincidence detector 202 and the values of the loop lock L and the valid bit V of the corresponding cache line are fed to a prefetch address decider 206. The logic of the prefetch address decider 206 can be expressed by a combinatorial logic of the AND gate and the OR gate, as shown in FIG. 1, and its high-level output informs the instruction fetch control unit 40 of the fact that the valid instruction corresponding to the prefetch address is absent in the cache line, namely, to be prefetched. Specifically, for the cache line having the cache tag TAG coincident with the address tag of the prefetch address, the instruction is prefetched by the prefetch address if the valid bit V is invalid (to take the low level) and if the valid bit V is valid (to take the high level) whereas the loop lock is invalid (to take the low level). Thus, if the loop lock is valid when the valid bit V is valid, the prefetch for said cache line is suppressed so that said cache line is inhibited from being excluded (or rewritten) at the time of the instruction profetch.

In case a profetch is instructed to the instruction fetch control unit 40 by the output of the profetch address decider 206, the instruction fetch control unit 40 uses the instruction fetch address generated from the profetch address, to fetch the instruction of one cache line including the relevant instruction from the external memory 30, in the cache line of the cache memory 20. Simultaneously with the end of this line fetch, the valid bit V of the relevant cache line is set true, and the cache tag is set with the content corresponding to the address tag of the profetch address. Moreover, when the instruction fetch control unit 40 receives a signal inhibiting the instruction rewrite in the relevant data portion of the cache memory 20 from the prefetch address decider 206, the selector 203 feeds an instruction signal for selecting the output of the external memory 30.

When the program control of the central processing unit 1 is in the feedback loop section, as apparent from the foregoing description, the loop lock L of the cache line including the instruction in the loop section, i.e., the instruction once executed by the central processing unit 1 is brought into the set state. The exclusion of the prefetch is inhibited for the cache line including the loop lock L in the set state. Thus, the instruction string in the loop can be latched in the cache memory 20 till the program control transfers to the outside of the loop, so that the number of accesses to the external memory 30 can be reduced to improve the performance of the system using the cache memory 20. In the embodiment shown in FIG. 1, the central processing unit 1 is formed over the signal semiconductor chip, but the present invention should not be limited thereto. Specifically, the cache memory 20, the coincidence detector 202, the execution address decider 205, the prefetch address decider 206 and the selector 203 may also be formed over the same semiconductor chip as the central processing unit 1.

[3] Feedback Loop

Here will be described how to decide whether or not the instruction fetched by the central processing unit 1 has a locality, that is, according to the present invention, whether or not the instruction fetched and to be executed by the central processing unit 1 is included in the instruction string constituting the feedback loop.

Figure 2:
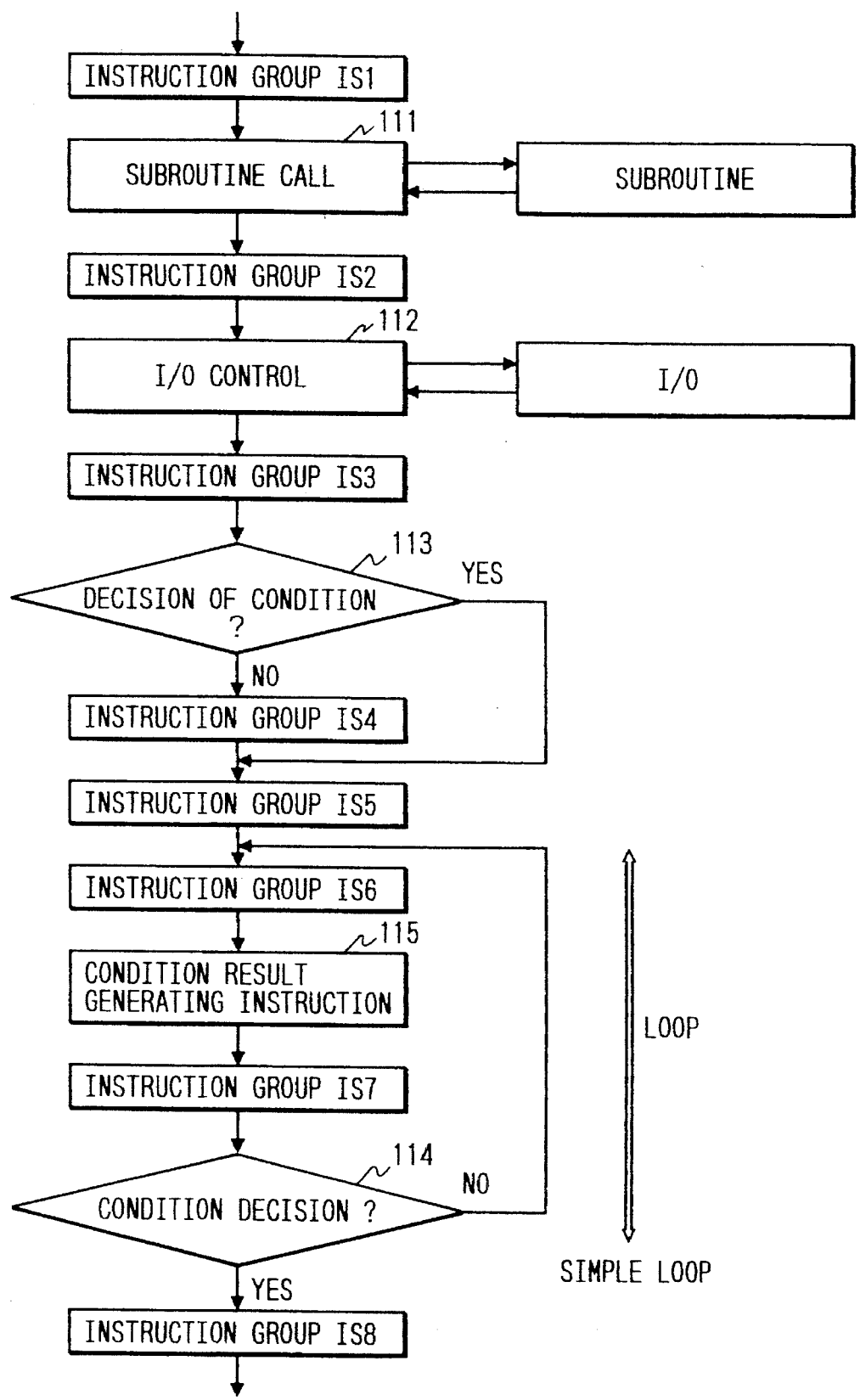
FIG. 2 is a diagram for explaining of a simple loop in a program.

First of all, the definition of the feedback loop (as will be shortly referred to as the "loop") will be described with reference to FIGS. 2 and 3. FIG. 2 shows an example of a simple loop in the program. This simple loop is composed of an instruction string of an instruction group IS6, a condition result generating instruction 115, an instruction group IS7 and a condition decision 114. The execution result of the condition result generating instruction 115 is decided at the step of the condition decision 114. If this result is true (or Yes), the control transfers to an instruction group IS8 outside of the loop. If false (or No), the loop is branched to the instruction group IS6 so that it may be continued. The simple loop does not include a complicated program string such as a subroutine call 111 or an I/0 control 112. Moreover, the substantial final instruction of the loop is frequently a backward (i.e., in the direction inverted from the instruction execution order for the address of the instruction being executed) condition branching instruction such as the condition decision 114. Incidentally, a condition decision, as designated at 113, is a forward condition branching instruction.

Figure 3:
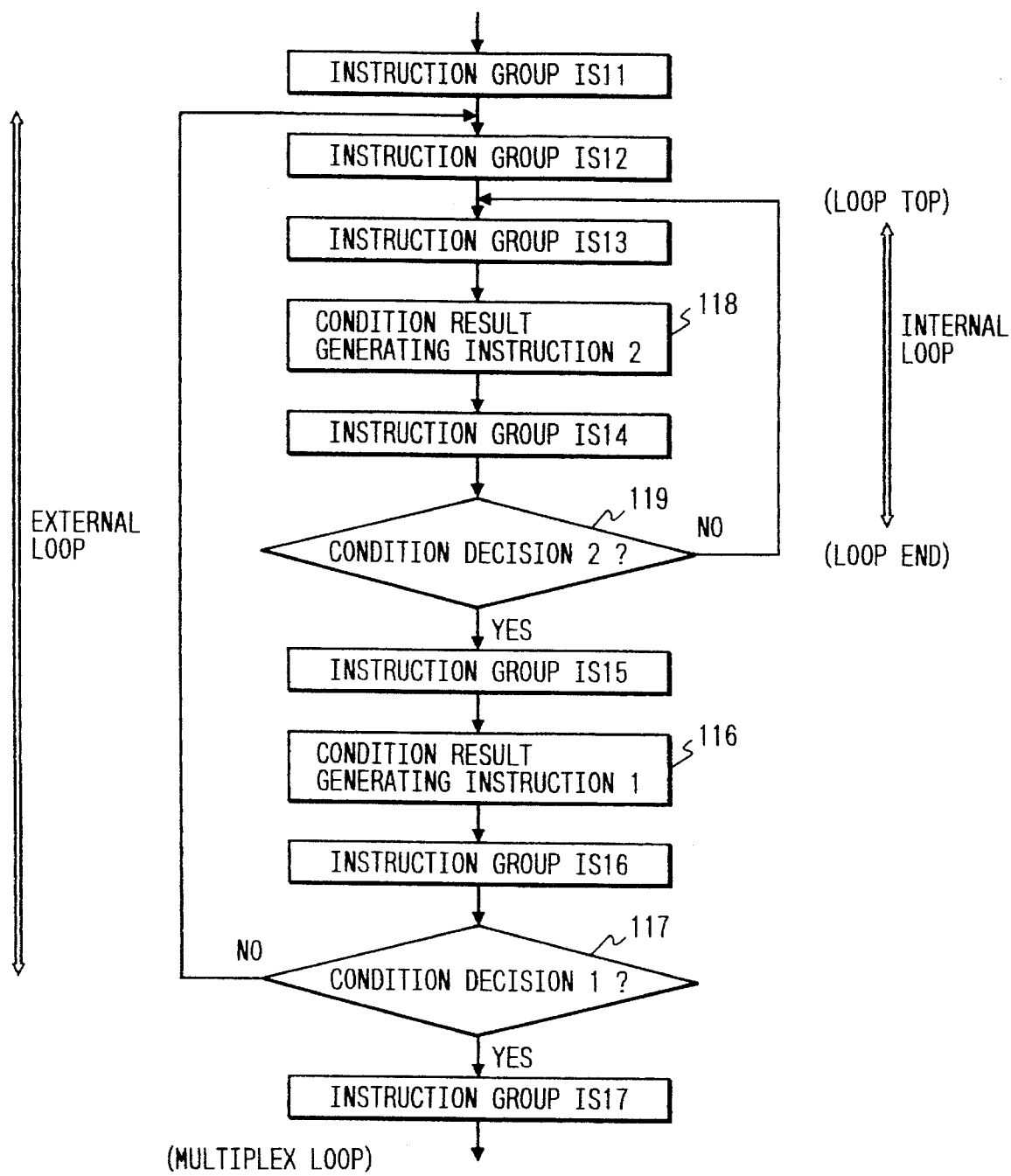
FIG. 3 is a diagram for explaining a multiplex loop in a program.

FIG. 3 shows an example of a multiplex loop. An instruction string of an instruction group IS13, a condition result generating instruction 118, an instruction group IS14 and a condition decision 119 constitutes an internal loop. An instruction string from an instruction group IS12 to a condition decision 117 constitutes an external loop. The multiplex loop has its internal loop enclosed by the external loop. If the cache memory 20 can store the external loop as a whole, the instruction execution time period of the multiple loop section can be shortened. In this case, whether or not the instruction execution in the loop is completed is confirmed in terms of the branching direction of the processing by the condition decision 117. Incidentally, in the multiplex loop in FIG. 3, the leading instruction is the loop top, and the trailing instruction is the loop end.

[4] Loop Hint and Feedback Loop Recognizing Method

Here will be described the method of confirming a loop in a program.

In case only the simple loop is present in the program, the method is simple. If a backward condition branching instruction is found while an instruction is being executed, a series of instructions from the destination instruction to the backward branching instruction may be determined to the loop section. Since, however, this method does not consider the structures of the multiplex loop and the cache memory, it should be noted that the applicable range is narrowed.

According to another method, on the other hand, a bit information for a loop hint indicating the loop instruction is added to the instruction so that it can be used for the decision.

Figure 4:
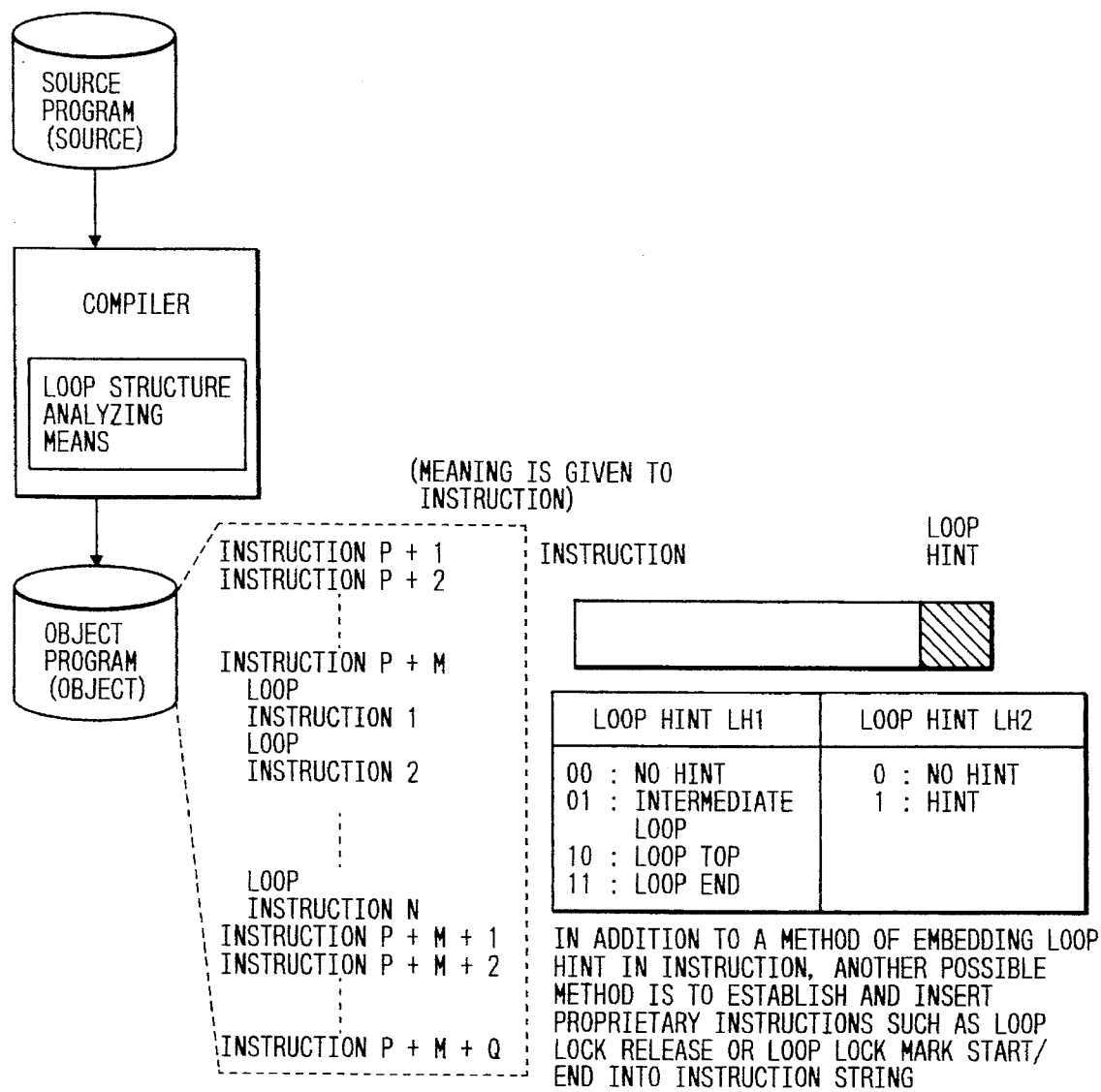
FIG. 4 is a diagram for explaining a loop deciding loop hint in a program.

FIG. 4 shows an example of a method for adding bit information for the loop hint. By using the loop structure analyzing means of a compiler for generating an object program from a source program, the bit information for the loop hint indicating the loop instruction is added to an instruction when the object program is to be generated. According to this method, the compiler can determine an optimum loop section while considering the structure of the cache memory and the size and multiplexity of the loop. For example, a loop hint LH1 is given 2 bits by considering the reliability and expresses four states: the "No Hint" state (which means that the instruction does not constitute the loop); the "Intermediate Loop" state (which means that the instruction is a loop composing instruction interposed between the loop top and the loop end); the "Loop Top" state (which means the loop top); and the "Loop End" state (which means the loop end). For example, the compiler adds, if it decides that the external loop can be stored in its entirety in the cache memory 20, the loop top to the leading instruction of the instruction group IS12, as shown in FIG. 3, and the loop end to the instruction of the condition decision 117. The intermediate loop is added to the other instructions in the loop section. On the other hand, the loop hint can be constituted of 1 bit, as indicated at LH2.

Figure 5:
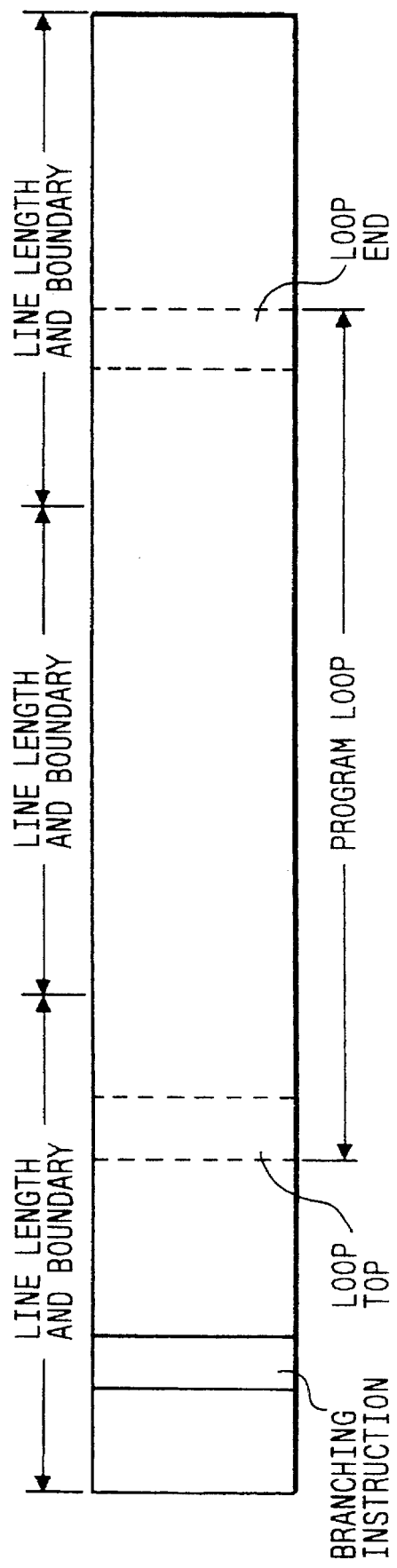
FIG. 5 is a diagram for explaining a relation between a line fetch and a loop.

FIG. 5 shows a relation between the line fetch and the loop. As shown in FIG. 5, an instruction having the loop hint added thereto may be present in the instruction string (or cache line) read by the prefetch or the like. At this time, even if an instruction having the loop hint is present in the cache memory 20, the central processing unit 1 should not recognize that an instruction string in the loop is present in the cache memory 20, till that instruction is executed. This is because a program loop may not be executed in FIG. 5 in dependence upon the executed state of the branching instruction to be executed before that program loop. In FIG. 1, considering it, the set/reset of the loop lock L is controlled on the basis of the result that the instruction to be executed is decoded.

Figure 6:
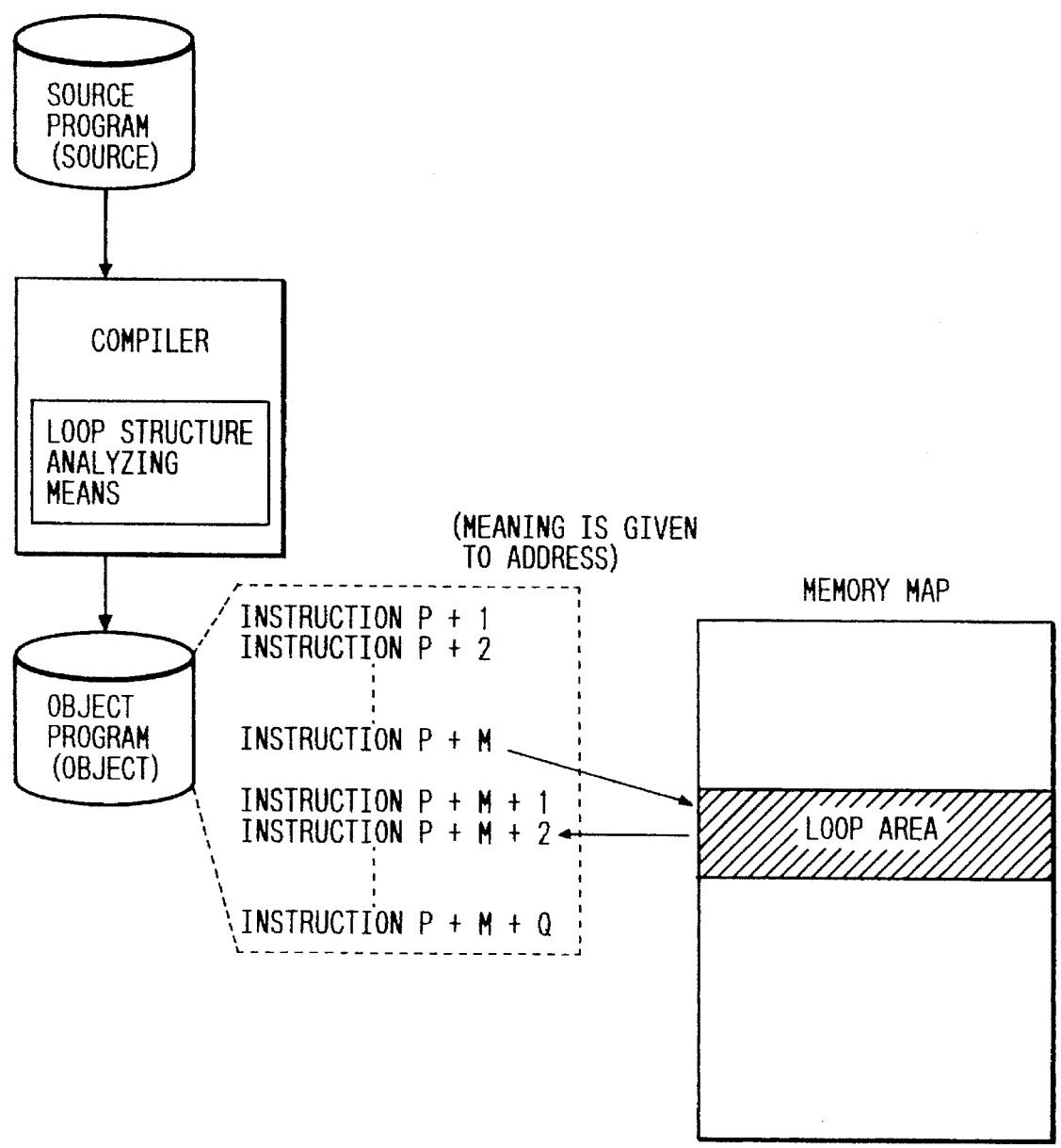
FIG. 6 is a diagram for explaining a principle enabling a program loop to be decided by giving a meaning to an address of an instruction.

The loop confirming method to be adopted may be exemplified, in addition to the aforementioned method of adding the bit such as the loop hint to the instruction, by a method, as shown in FIG. 6, in which only the loop instruction string is extracted at the time of generating a target program by using the loop structure analyzing means of the compiler and is arranged in a predetermined area (e.g., loop area). This method gives an intrinsic meaning to the address of the instruction constituting the loop so that the loop can be confirmed by decoding the instruction address. In another method, a proprietary instruction can also be used to indicate the loop section. The proprietary instruction is exemplified by the instruction (i.e., the loop lock mark start) for instructing the setting of the loop lock L of the corresponding cache line at each instruction execution or by the instruction (i.e., the loop lock mark end) for resetting a loop lock ROCK from the set state.

[5] Loop Lock Controlling Method

Figure 7:
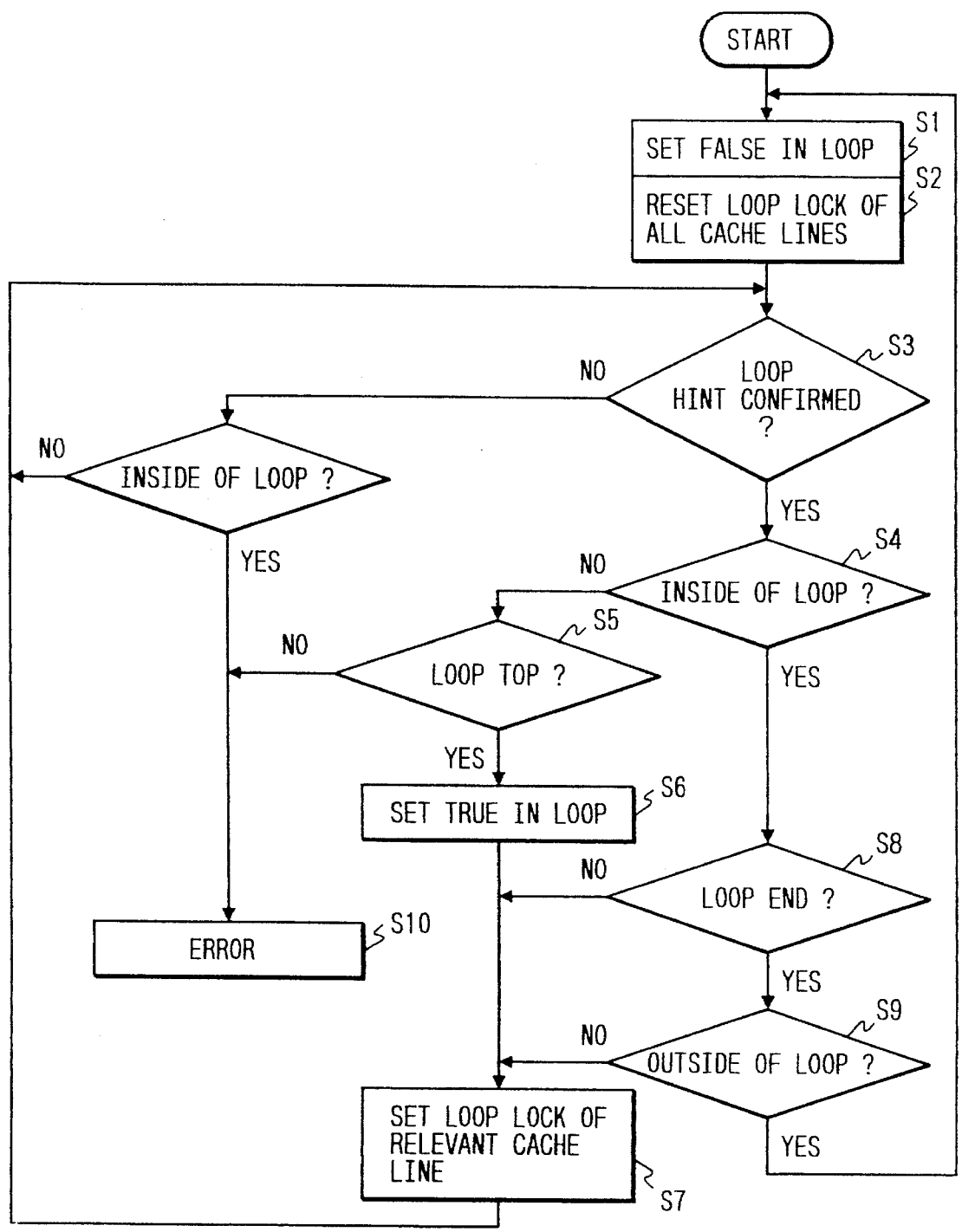
FIG. 7 is a flow chart showing one example of a control procedure of a loop lock when the loop hint LH1 of FIG. 4 is used.

FIG. 7 is a flow chart showing one example of the control procedure of the loop lock L by using the aforementioned loop hint LH1. This procedure is provided to hold the instructions in the loop as many as possible in the cache memory, while the instruction string in the feedback loop is being executed, so that the instructions in that feedback loop may be promptly excluded from the cache memory once the program control (or the program flow) transfers to the outside of the loop.

The procedure of FIG. 7 will be described with reference to FIG. 1. In an initial state as after the reset is released, the loop lock status flag for indicating whether or not the loop instruction is being executed in the central processing unit 1 is set false (in the loop) (at S1), and the loop lock L of all the cache lines in the cache memory 20 is reset (at S2).

The central processing unit 1 starts execution of the instruction to read the instruction in the instruction decoder 100 from the instruction cache memory 20. At this time, the loop hint LH1 added to the instruction is confirmed (at s3), and appearance of the instruction having the loop top added is awaited (at S4 and S5).

If the instruction having the loop top added is confirmed, the loop lock status flag is set true (in the loop) (at S6). Simultaneously with this, the loop lock L of the relevant cache line is also set (at S7).

Once the loop is entered, the loop lock L of the relevant cache line is set (at S7) till an instruction having the loop end added appears (at S8 and S9). If the instruction having the loop end added is confirmed (at S8), it is confirmed (at S9) by a branch decision whether or not the program control transfers to the outside of the loop. In case of branching into the loop, the loop lock L of the cache line is set (at S7) and kept in this set state (at S7) as above till the instruction having the loop end added appears (at S8 and S9).

In case of branching to the outside of the loop (at S9), on the other hand, the loop lock status flag 101 is set false (at S1), and the loop lock L of all the cache lines in the cache memory is reset (at S2). As above, moreover, the loop hint LH1 added to the instruction is confirmed (at S3), and the appearance of the instruction having the loop top added is awaited (at S4 and S5).

Incidentally, an error is issued (at S10), either if an instruction having the loop end or intermediate loop added is confirmed before the confirmation of the instruction having the loop top added or if an instruction having no loop hint is confirmed before the confirmation of the instruction having the loop end added. Against this error, there is packaged a mechanism for releasing the loop lock L automatically, or a loop lock releasing instruction is awaited so that the error may be handled by the system or an exceptional handler of the user.

The decision whether or not the instruction is to be prefetched is executed by the prefetch address decider 206, as described above. This decider 206 starts the line fetch of the instruction fetch control unit 40, either if the valid bit V of the relevant cache line indicated by the prefetch address is false, or if the valid bit V is true, if the detection of coincidence with the cache tag TAG is false and if the loop lock L is false. Thus, while the instruction string in the feedback loop is being executed by the control procedure for the loop lock L of FIG. 7 and by the starting procedure of the instruction prefetch, the instructions in the loop are held as many as possible in the cache memory, so that the instructions in the relevant feedback loop can be promptly excluded from the cache memory once the program control (or the program flow) transfers to the outside of the loop.

Figure 8:
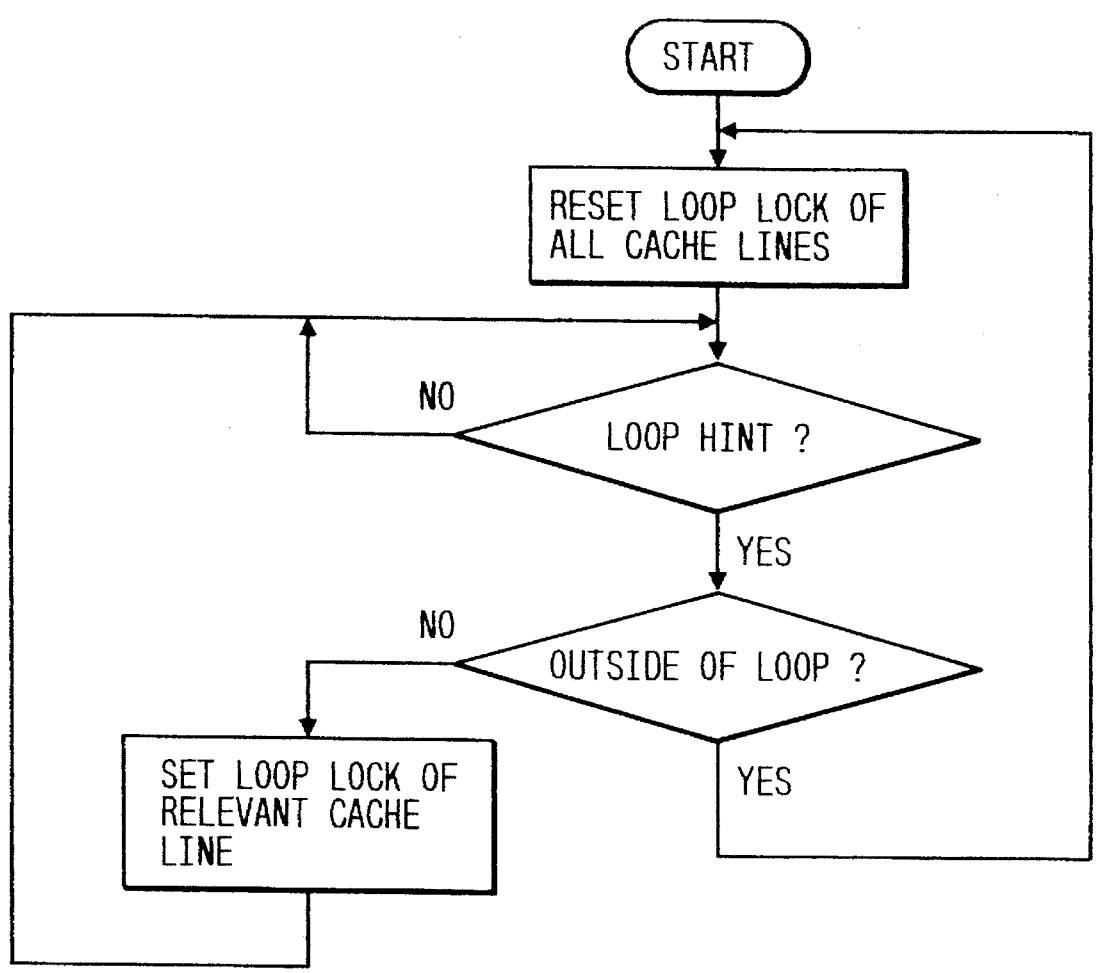
FIG. 8 is a flow chart showing one example of a control procedure of a loop lock when the loop hint LH2 of FIG. 4 is used.

FIG. 8 is a flow chart showing one example of the control procedure of the loop lock when the loop hint LH2 is used. After the loop lock L of all the cache lines has been reset, it is decided whether or not the loop hint is present. If the answer is YES (i.e., LH2=1), it is decided whether or not the control is transferred to the outside of the loop by executing the instruction having said loop hint added. If the answer is NO, the loop lock of the relevant cache line is set. When the control is transferred to the outside of the loop, the loop lock L of all the cache lines is reset. In this control procedure, the decision of whether or not the control is transferred to the outside of the loop can be executed by branching the processing backward, when said instruction is the backward branching instruction, with reference to the arithmetic result or the like of the subsequent instruction address. In this control procedure, the loop hint is assumed to be 1 bit, and the loop lock status flag 101 is also omitted. Thus, the error cannot be detected, but the control is simplified.

[6] Set Associative Type Cache Memory Applied System (Using Loop Lock)

Figure 9:
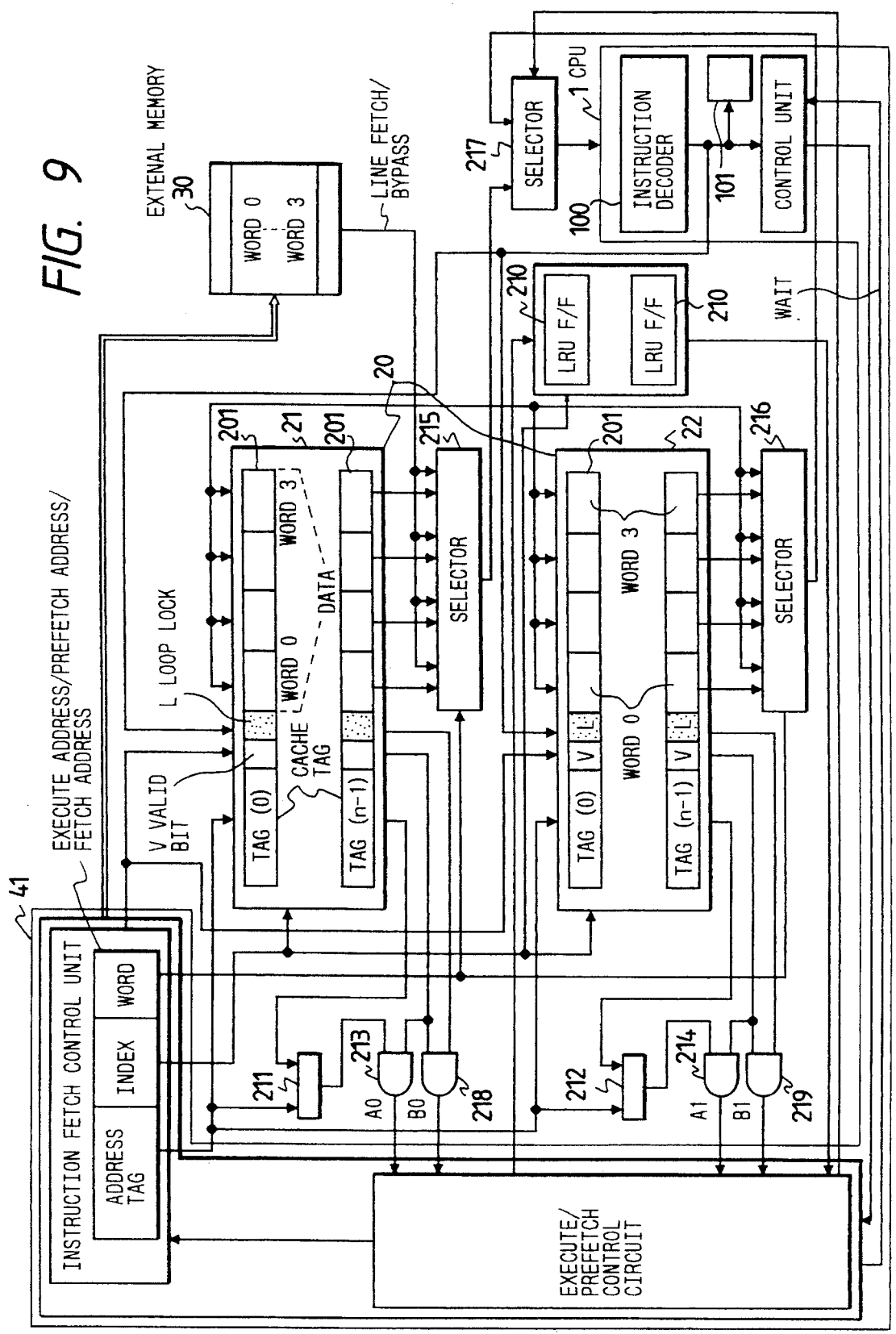
FIG. 9 is a block diagram showing one embodiment of a cache control system utilizing an instruction cache memory of two-way set associative type.

FIG. 9 is a block diagram showing one embodiment of the instruction cache memory of two-way set associative type. The cache memory 20, as shown in FIG. 9, is composed to include: two direct memory map portions 21 and 22 individually having the cache lines corresponding to the common address information outputted by an instruction fetch control unit 41; an LRU flag 210 for indicating the cache line which is most recently referred to between the cache lines corresponding to the aforementioned common address information in the individual direct memory map portions 21 and 22. These direct memory map portions 21 and 22 individually have an n-number of cache lines, and the total number of LRU flags is n.

The cache lines 201 of the individual direct memory map portions 21 and 22 are identical to those described with reference to FIG. 1, and each of them is equipped with the loop lock L as a locality indexing area. The loop lock L is an area for indexing the locality of the instruction fetched by the central processing unit 1. If the instruction fetched and to be executed by the central processing unit 1 is contained in the instruction string constituting the feedback loop, as in the foregoing embodiment, the loop lock L corresponding to the cache line holding that instruction is set as means the locality. According to the present embodiment, whether or not the instruction to be executed is one constituting the feedback loop is decided by the instruction decoding of the instruction decoder 100. This decision result is reflected upon the loop lock L of the individual direct memory map portions 21 and 22, and it is reflected upon the loop lock status flag 101 that the control of the central processing unit enters the loop.

The aforementioned LRU flag 210 acts as a weight, when the data portion DATA or the like of the cache line is to be replaced, and indicates the cache line which is most recently referred to. According to the present embodiment of two-way set associative type, the set state of the LRU flag 210 indicates the corresponding cache line at the side of the direct memory map portion 21, and the reset state of the LRU flag 210 indicates the corresponding cache line at the side of the direct memory map portion 22. At the time of exchanging the cache lines fox the instruction prefetch, therefore, the cache lines, which are not indicated by the LRU flag 210, are exchanged. This control is executed by the instruction fetch control unit 41.

The instruction fetch control unit 41 makes it possible that the instruction to be executed by the central processing unit 1 can be read out from the direct memory map portion 21 or 22 and fetched by the central processing unit 1. Specifically, the control unit demands the instruction fetch control unit 41 to read out the instruction which is presumed to be subsequently executed by the instruction being executed. At this time, the control unit gives the instruction address to the instruction fetch control unit 41. This instruction fetch control unit 41 uses the given instruction address as the execution address to retrieve whether or not the relevant instruction is present in the cache memory 20. For this retrieval, the trisected portions of the execution address, i.e., the address tag, the index and the word are utilized. The index is used to select the cache lines respectively from the two direct memory map portions 21 and 22. The cache tag TAG of the selected cache line and the address tag of the execution address are compared by coincidence detectors 211 and 212.

Then, it is confirmed whether or not the relevant instruction is present in the individual cache lines 201 selected. Specifically, this confirmation is executed by execution address deciders 213 and 214, as represented by AND gates in FIG. 9. If the outputs of the coincidence detectors 211 and 212 are coincident, i.e., true (to take the high level according to the present embodiment) so that the aforementioned valid bit V is true (to take the high level), the execution address deciders 213 and 214 inform the instruction fetch control unit 41 of the fact that the relevant instruction is present in that cache line. In this informing mode, either or both A0 (i.e., the output of the execution address decider 213) and A1 (i.e., the output of the execution address decider 214) are set true (to take the high level =1).

In case A0=1 and A1=0, the instruction fetch control unit 41 outputs the instruction on the relevant cache line of the direct memory map portion 21 through a selector 215 by the word of the execution address, and the outputted instruction is selected by a selector 217 and transferred to the central processing unit 1.

In case A0=0 and A1=1, the instruction fetch control unit 41 outputs the instruction on the relevant cache line of the direct memory map portion 22 through a selector 216 by the word of the execution address, and the outputted instruction is selected by the selector 217 and transferred to the central processing unit 1.

In case A0=1 and A1=1, an error can be issued to restore the state by an exceptional processing, or either of the cache lines can be invalidated to continue the instruction execution.

In case A0=0 and A1=0, the line fetch is executed. Specifically, in both A0 and A1 are false (to take the low level) for the aforementioned execution address, the instruction fetch control unit 41 recognizes that the relevant instruction is not present in the cache line indicated by the index area of the execution address, and uses the instruction fetch address corresponding to the execution address, to fetch the instruction of one cache line including the relevant instruction to the relevant cache line of the cache memory 20 from the external memory 80. At this time, the instruction fetch control unit 41 selects one of the cache lines in accordance with the value of the LRU flag 210 corresponding to the index of the instruction prefetch address and transfers the relevant instruction to the central processing unit 1 like before through the selectors 215, 218 and 217. Simultaneously with the end of the line fetch, the instruction fetch control unit 41 sets true the valid bit V of the cache line at the side including the relevant instruction and the content corresponding to the address tag of the instruction fetch address in the cache tag TAG of that cache line, and changes the state of the corresponding LRU flag 210 so as to indicate that the cache line is most recently referred to. The execute/prefetch control circuit feeds the control unit the wait signal wait so as to stop the instruction execution control by the control unit, when it receives the signals of A0=0 and A1=0. The control unit reopens the instruction execution control when it is fed with the instruction through the selector 217 and the instruction decoder 100.

The instruction fetch control unit 41 further executes the instruction prefetch control. Specifically, If the central processing unit 1 exchanges no data with the external memory 30, the instruction fetch control unit 41 prefetches the instruction by using the prefetch address, which is predicted from the instruction execution address from the control unit, to line-fetch the instruction from the external memory 30 to the relevant cache line 201 of the cache memory 20. This prefetch control will be described in more detail. At first, the instruction fetch control unit 41 sues the prefetch address to retrieve whether or not the relevant instruction is present in the cache memory 20. For this retrieval, the trisected portions of the prefetch address, i.e., the address tag, the index and the word are utilized. The index of the prefetch address is used to select the cache line of the cache memory 20. It is indicated by the valid bit V whether or not the valid instruction has already been read in the cache line 201. The values of the loop lock L and the valid bit V of the cache line selected by the index are fed to prefetch address deciders 218 and 219. These prefetch address deciders 218 and 219 have their logics expressed individually by AND gates. At the time of the instruction prefetch, the instruction fetch control unit 41 refers to the aforementioned signals A0 and A1 as well as a signal B0 (i.e., the output of the prefetch address decider 218) and B1 (i.e., the output of the prefetch address decider 219). As a result, the prefetch is executed in the following modes.

(1) A0=0, A1=0, B0=0 and B1=0

The cache line to be prefetched is selected according to the value of the LRU flag corresponding to the index of the instruction prefetch address. Incidentally, this state has a board meaning that neither the instruction indicated by the execution address or prefetch address nor the loop-locked instruction is present in the corresponding cache line.

(2) A0=0, A1=0, B0=0 and B1=1

In the cache line corresponding to the index of the instruction prefetch address, the corresponding cache line of the direct memory map portion 22 is being loop-locked, and the corresponding cache line of the direct memory map portion 21 is selected to prefetch the instruction coming from the external memory 30.

(3) A0=0, A1= 0, B0=1 and B1=0

In the cache line corresponding to the index of the instruction prefetch address, the corresponding cache line of the direct memory map portion 21 is being loop-locked, and the corresponding cache line of the direct memory map portion 22 is selected to prefetch the instruction coming from the external memory 30.

(4) A0=0, A1=0, B0=1 and B1=1

Both the cache lines of the individual direct memory map portions 21 and 22 corresponding to the index of the instruction prefetch address are being loop-locked. At this time, the prefetch of the instruction is invalidated for the two cache lines. Alternatively, the cache line to be prefetched may be selected according to the value of the LRU flag corresponding to the index of the instruction prefetch address.

As is apparent from the aforementioned prefetch modes, in case the loop lock L contained in the cache line corresponding to the index of the instruction prefetch address is set, the prefetch for said cache line is suppressed, and that cache line is inhibited from being excluded at the time of the instruction prefetch. When the instruction prefetch is to be executed according to the aforementioned modes, the instruction fetch control unit 41 line-fetches the instruction of one cache line including a desired instruction of the external memory 30 to the relevant cache line by using the instruction fetch address generated from the prefetch address. Simultaneously with the end of the line fetch, the instruction fetch control unit 41 sets the valid bit V of the relevant cache line true, and sets the content corresponding to the address tag of the prefetch address in the cache tag.

In the embodiment of FIG. 9, the control procedure when the aforementioned loop hint LH1 is used is basically identical to that of FIG. 7. When the program control of the central processing unit 1 is in the feedback loop section, the loop lock L of the cache line containing such an instruction in said loop section as has been once executed by the central processing unit 1 is set. The cache line including the loop lock in the set state is inhibited from rewriting the instruction by the prefetch. As a result, the instruction string in the loop can be held in the cache memory 20 till the program control transfers to the outside of the loop, so that the number of accesses to the external memory 30 can be reduced to improve the performance of the system utilizing the cache memory 20.

Moreover, the loop lock L of all the cache lines is reset so that the instructions in the feedback loop may be held as many as possible in the cache memory 20, while the instruction string in said feedback loop is being executed, but promptly excluded (or rewritten) from the cache memory 20 once the prograin control (or the program flow) transfers to the outside of the loop. Especially at this time, simultaneously with the loop lock release, the state of the LRU flag 210 can be reversed to clear the cache memory positively of the instruction string in the loop, which has been executed so that it has a low probability of being executed again.

[7] Set Associative Type Cache Memory Applied System (Using Loop Mark)

Figure 10:
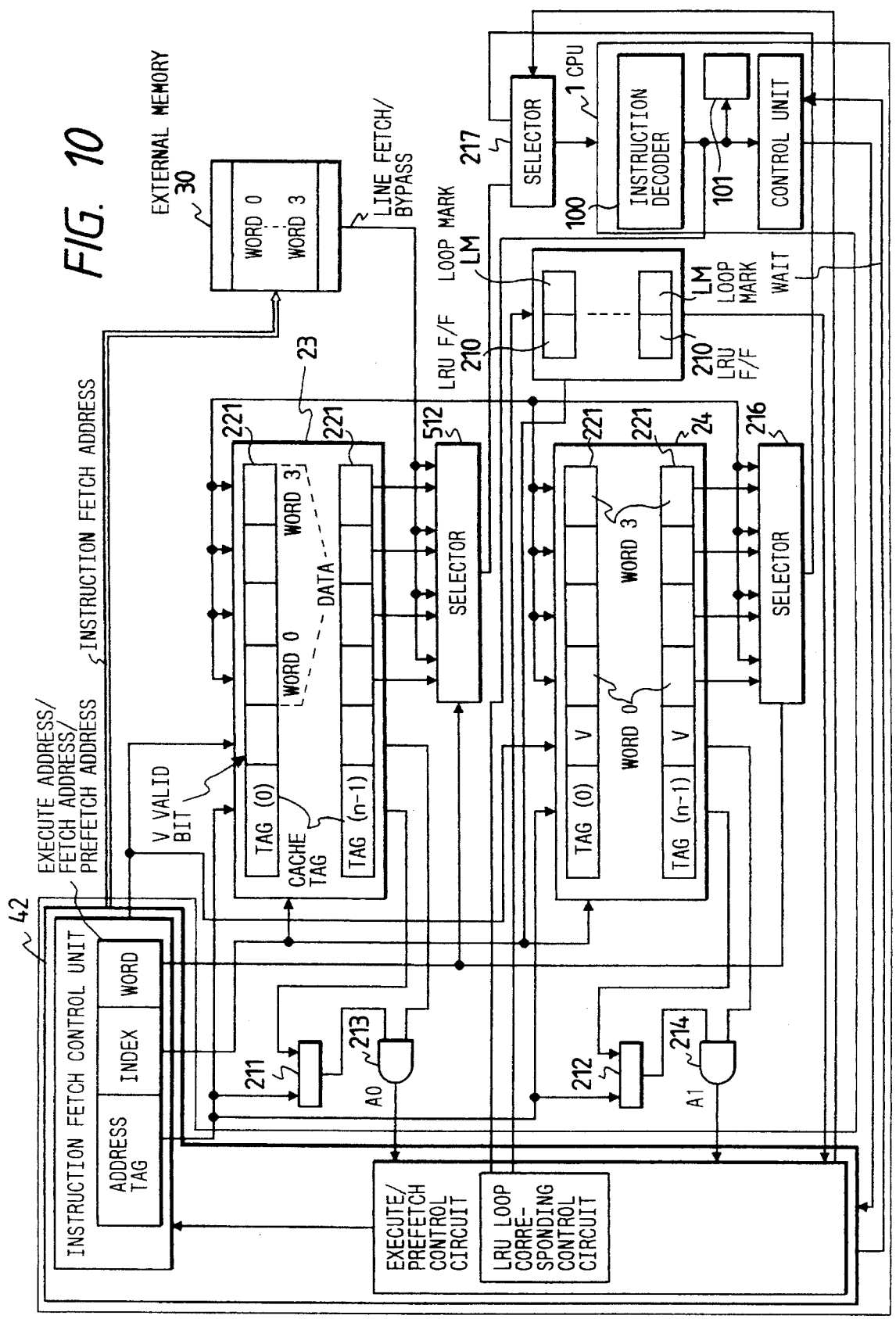
FIG. 10 is a block diagram showing one embodiment of a cache control system utilizing an instruction cache memory of two-way set associative type adopting no loop lock.

FIG. 10 is a block diagram showing an embodiment of the cache memory system using none of the loop lock L in the two-way set associative type. In the present embodiment, the start of the loop is conforming the aforementioned backward branching instruction. In order to invert the LRU flag 210 in a manner to exclude the instruction string in the loop positively from the cache memory as above at the instant when the instructions in the loop are completed, a loop mark LM having a meaning for enabling the cash line, in which the in-loop instruction has been present, to be discriminated is provided in one-to-on relation to each LRU flag 210. This loop mark LM is also an area for indexing the locality of the instruction fetched by the central processing unit 1. If the instruction fetched and to be executed by the central processing unit 1 is contained in the instruction string constituting the feedback loop, the loop mark LM is set like the foregoing embodiment as has a meaning that the instruction corresponding to the cache line holding it has the locality. According to the present embodiment, whether or not the instruction to be executed constitutes the feedback loop is decided by the instruction decoding of the instruction decoder, and the result is reflected upon the loop mark LM and the loop lock status flag 101.

Figure 11:
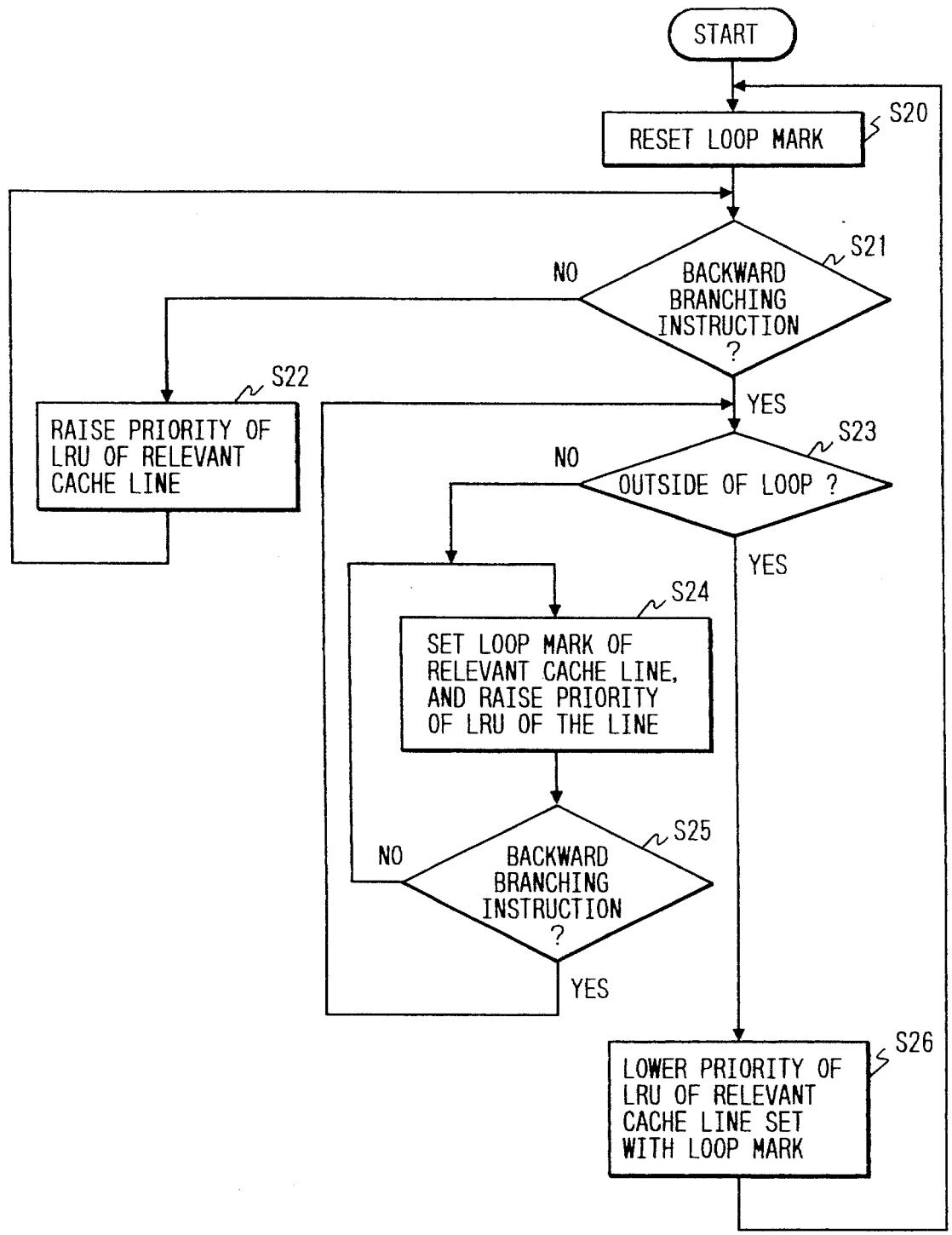
FIG. 11 is a flow chart showing one example of a set/reset control procedure for an LRU flag and a loop mark in the system of FIG. 10.

The control of the set/reset of the LRU flag and the loop mark LM is executed by the LRU loop corresponding control circuit included in an instruction fetch control unit 42. This control procedure is shown in FIG. 11. At first, the loop mark LM is reset (at S20), and it is then decided (at S21) whether or not the instruction is the backward branching instruction. If the answer is N0, the priority of the LRU flag of the relevant cache line is raised (at S22). In case of the backward branching instruction, it is decided (at S23) whether or not the control is transferred to the outside of the loop. As far as the instruction in the loop is executed, the loop mark M of the relevant cache line is set, and the priority of that cache line is raised by the LRU flat (at S24 and S25). The cache line corresponding to the LRU flag 210 having its priority raised is recognized as the most recently utilized one. At the time of the instruction prefetch, therefore, the other cache line pairing said cache line (i.e., sharing the LRU flag) is a target to be excluded. If the control is transferred to the outside of the loop, the state of the LRU flag of the relevant line, which has its loop mark LM set, is inverted to lower the priority (at S26). According to this procedure, the LRU flag 210 having its loop mark LM set is held without any change in the high priority state till the loop mark LM is reset. In other words, the cache line relating to the LRU flag 210 having its loop mark LM set is always excluded at the instruction prefetch from the target of interchange and is held in the cache memory till the control is transferred to the outside of the loop section. This can be utilized as a function for protecting the multitask. If the control transfers to the outside of the loop, the state of the LRU flag corresponding to the loop mark LM in the set state is inverted (to have its priority lowered), so that the instruction string in the loop, which has been executed to have a lower probability of being executed again, is positively excluded from the cache memory.

The instruction fetch control unit 42 executes the following decisions for the outputs A0 and A1 of the address deciders 213 and 214. The instruction fetch control unit 42 controls the instruction fetch from the cache memory 20, the instruction fetch through the line fetch from the external memory 30 and the instruction prefetch from the external memory 30 in accordance with the following decision results and the control procedure of FIG. 11.

(1) A0=0 and A1=0

In this state, any valid instruction is not present in the cache lines of either direct memory map portion 23 or 24. At this time, the cache line to be prefetched or line-fetched is selected according to the value of the LRU flag corresponding to the index of the instruction address. Incidentally, this state broadly means the state, in which the instruction indicated by the execution address or the prefetch address is not present in the corresponding cache line. At this time, as described in embodiments of FIG. 1, FIG. 9, the control unit is fed with the wait signal wait to stop the instruction execution control temporarily.

(2) A0=0 and A1=1

In this state, the valid instruction is already present in the cache line of the direct memory map portion 24. Neither the prefetch nor the line fetch is executed, and the instruction corresponding to the instruction address at this time is read from the direct memory map portion 24 to the central processing unit 1.

(3) A0=1 and A1=0

In this state, the valid instruction is already present in the cache line of the direct memory map portion 23. The prefetch and the line fetch are not executed, but the instruction corresponding to the instruction address at this time is read from the direct memory map portion 23 to the central processing unit 1.

(4) A0=1 and A1=1

In this state, the valid instruction is present in the cache lines of both the direct memory map portions 23 and 24. At this time, an error occurs to restore the state by the exceptional processing, or either of the cachelines is invalidated to continue the instruction execution.

In the present embodiment, too, when the program control of the central processing unit 1 is in the feedback loop section, the loop lock of the cache lines including such an instruction in said loop section as was once executed by the central processing unit 1 is brought into the set state. The cache line containing the loop lock in the set state is inhibited from excluding the prefetch. As a result, the instruction string in the loop can be held in the cache memory till the program control transfers to the outside of the loop, so that the number of accessing to the external unit 30 can be reduced to improve the performance of the system utilizing the cache memory 20.

Although our invention has been specifically described in connection with its embodiments, it should not be limited thereto but can naturally be modified in various manners without departing from the gist thereof. For example, the individual contents thus far described in the foregoing embodiments can cope with an applied system flexibly by selecting them partially or wholly in conformity with the specifications of the system or by using them in combination. Moreover, the cache memory of the set associative type should not be limited to the two-way type but can adopt three or more direct memory map portions.

In the description thus far made, our invention has been described by exemplifying the system, to which is applied the instruction cache memory providing the field of application backgrounding the invention. This invention should not be limited thereto but can be widely utilized in either the data cache memory or the system to which is applied the cache memory shared between the data and the instructions.

The effects obtained by the representative of the invention disclosed herein will be briefly described in the following.

(1) Since the instruction to be conditionally branched backward for the present execution address constitutes the loop structure for executing the same instruction string repeatedly, the number of accessing to the external memory can be reduced to improve the performance of the system utilizing the cache memory by holding the instruction string of the loop in the cache memory till the program control is transferred to the outside of the loop by the condition decision.

(2) The data processing efficiency by the prefetch can be improved by excluding the instructions of the feedback loop section positively or dominantly from the cache memory when the instruction to be executed transfers from said feedback loop section to the outside.

(3) Thanks to the aforementioned effects, the instruction string outside of the loop section including conditional branching instructions as many as possible can be prefetched even if said conditional branching instruction should appear.

(4) The data processing efficiency by the cache memory can be improved to the maximum by holding the instructions of the feedback loop as many as possible in the cache memory while the instruction string in the loop are being executed, and by excluding the instructions in said feedback loop promptly from the cache memory if the program control (or program flow) once transfers to the outside of the loop.

What is claimed is:

1. In a data processor including a central processing unit which is capable of executing a plurality of instructions including instructions for forming a feedback loop and a cache memory in which an instruction for the central processing unit is stored, said cache memory comprising:

a data area in which the instruction is stored;

a tag area which corresponds to the data area and in which an address related to the instruction is stored;

a lock area which corresponds to the data area, in which data for inhibiting an instruction to be stored in the data area from being rewritten is set by the central processing unit if decoding of the instruction by the central processing unit during execution of the instruction to be stored in the data area indicates that the instruction to be stored in the data area is a part of the feedback loop, and in which data for allowing the instruction to be stored in the data area to be rewritten is set by the central processing unit, if the decoding of the instruction by the central processing unit indicates that the instruction to be stored in the data area is outside of the feedback loop; and a control circuit which controls the rewriting of the corresponding data area in accordance with the data in the corresponding lock area, so as to inhibit the rewriting to the data area if the data in the lock area indicates rewriting is to be inhibited, and so as to allow rewriting to the data area when the data in the lock area indicates allowance of the rewriting.

2. The cache memory according to claim 1, further comprising:
a valid bit area which corresponds to the data and in which data for indicating whether the instruction stored in said data area is valid or invalid is stored.

3. The cache memory according to claim 2,
wherein said tag area includes a plurality of tag areas, said data area includes a plurality of data areas each of which corresponds to each of the plurality of tag areas, said valid bit area includes a plurality of valid bit areas each of which corresponds to each of the plurality of tag areas, and said lock area includes a plurality of lock areas each of which corresponds to each of the plurality of tag areas.

4. The cache memory according to claim 3,
wherein each of said data areas stores a plurality of instructions.

5. The cache memory according to claim 4,
wherein the control circuit includes:
a comparison circuit comparing an address outputted from said central processing unit with the address stored in a corresponding tag area to detect whether or not the address related to the instruction required by the central processing unit exists in the said corresponding tag area.

6. The cache memory according to claim 5,
wherein the control circuit includes:.
a decision circuit which decides whether or not the instruction stored in said data area is to be rewritten in response to an output signal from said comparison circuit, said data stored in said corresponding valid bit area, and said data set in said corresponding lock area.

7. The cache memory according to claim 6,
wherein said decision circuit outputs an inhibition signal for inhibiting the rewriting of the instruction stored in the data area, if the data in the corresponding valid bit area indicates the validity and the data in the corresponding lock area indicates the inhibition.

8. The cache memory according to claim 7, further comprising:
selector which provides one of the instruction stored in said cache memory and an instruction stored in a memory to said central processing unit.

9. The cache memory according to claim 8,
wherein said control circuit outputs to said selector an instruction signal for an instruction stored in said memory to said central processing unit when said inhibition signal from said decision circuit is outputted.

10. The cache memory according to claim 1,
wherein the central processing unit includes a decoder which forms the data to be set to the lock area, and control data to be used for controlling an operation of an execution unit included in the central processing unit by decoding the instruction to be stored in the data area of the cache memory.

11. The cache memory according to claim 10,
wherein said cache memory and said central processing unit are formed on a single semiconductor chip.

12. The cache memory according to claim 11,
wherein the instruction which is part of the feedback loop is a branch instruction.

13. The cache memory according to claim 11,
wherein the instruction has loop hint information which indicates whether or not the instruction is one of the instructions for the feedback loop.

14. A cache memory system comprising:
a memory storing a plurality of instructions which include instructions for forming a feedback loop;
a CPU executing said plurality of instructions; and
a cache memory storing a portion of said plurality of instructions stored in said memory,
said cache memory comprising:
a plurality of data areas in each of which each of the instructions included in said portion of instructions is stored;
a plurality of tag areas which correspond to each of the plurality Of data areas, and in each of which an address related to one of the instructions stored in the corresponding data area is stored;
a plurality of lock areas each of which corresponds to each of the data areas, in each of which data for inhibiting an instruction to be stored in the corresponding data area from being rewritten is set by the central processing unit, if decoding of the instruction to be stored in the corresponding data area by the central processing unit during execution of the instruction to be stored in the corresponding data area indicates that the instruction to be stored in the corresponding data area is part of the feedback loop, and in each of which data for allowing the instruction to be stored in the corresponding data area to be rewritten is set by the central processing unit, if the decoding of the instruction to be stored in the corresponding data area by the central processing unit indicates that the instruction to be stored in the corresponding data area is outside of the feedback loop; and
a control circuit which controls rewriting of data with an instruction from the memory in accordance with the data in a corresponding lock area, so as to inhibit the rewriting to the data area if the data in the corresponding lock area indicates the rewriting is to be inhibited, and so as to allow the rewriting to the data area when the data in the corresponding lock area indicates allowance of the rewriting.

15. The cache memory system according to claim 14,
wherein said cache memory further comprises a plurality of valid bit areas each of which corresponds to each of the plurality of data areas and in each of which data for indicating whether the instruction stored in the corresponding data area is valid or invalid is stored.

16. The cache memory system according to claim 15,
wherein each of said data areas stores a plurality of instructions.

17. The cache memory system according to claim 16,
wherein said cache memory further comprises a comparison circuit comparing an address outputted from said central processing unit with an address stored in a tag area to detect whether or not the address related to the instruction required by the central processing unit exists in the tag area.

18. The cache memory system according to claim 17,
wherein said control circuit comprises a decision circuit which decides whether or not the instruction stored in the data area is to be rewritten in response to an output signal from said comparison circuit, the data stored in the corresponding valid bit area, and the data set in the corresponding lock area.

19. The cache memory system according to claim 18, wherein said decision circuit outputs an inhibition signal for inhibiting the rewrite of the instruction stored in the data area, if the data in the corresponding valid bit area indicates the validity and the data in the corresponding lock area indicates the inhibition.

20. The cache memory system according to claim 19, wherein said cache memory comprises a selector which provides one of the instruction stored in said cache memory and an instruction stored in said memory to said central processing unit.

21. The cache memory system according to claim 20, wherein said control circuit outputs to said selector an instruction signal to feed the instruction stored in said memory to said central processing unit when said inhibition signal from said decision circuit, is outputted.

22. The cache memory system according to claim 21, wherein said central processing unit, said cache memory, said comparison circuit; and said selector are formed on a single semiconductor chip.

23. The cache memory according to claim 14, wherein the central processing unit includes a decoder which forms the data to be set to the corresponding lock area, and control data to be used for controlling an operation of an execution unit included in the central processing unit, by decoding the instruction to be stored in the corresponding data area in the cache memory.

24. The cache memory according to claim 23, wherein said cache memory and said central processing unit are formed on a single semiconductor chip.

25. The cache memory according to claim 24, wherein the instruction which is part of the feedback loop is a branch instruction.

26. The cache memory according to claim 24, wherein the instruction has loop hint information which indicates whether or not the instruction is one of the instructions for the feedback loop.

* * * * *